(12) United States Patent
Nagumo

(10) Patent No.: US 7,415,717 B1
(45) Date of Patent: Aug. 19, 2008

(54) INFORMATION RECEIVER AND INFORMATION RECEIVING METHOD

(75) Inventor: Fumio Nagumo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/700,150

(22) PCT Filed: Mar. 10, 2000

(86) PCT No.: PCT/JP00/01472

§ 371 (c)(1),
(2), (4) Date: Feb. 5, 2001

(87) PCT Pub. No.: WO00/54503

PCT Pub. Date: Sep. 14, 2000

(30) Foreign Application Priority Data

Mar. 11, 1999 (JP) .................................. 11-064416

(51) Int. Cl.
*H04N 7/025* (2006.01)
*H04N 7/10* (2006.01)
*G06F 13/00* (2006.01)
*G06F 3/00* (2006.01)

(52) U.S. Cl. ........................................... 725/47; 725/32

(58) Field of Classification Search .................. 725/32, 725/34–36, 47
See application file for complete search history.

(56) References Cited

U.S. PATENT DOCUMENTS 5,774,170 A    6/1998  Hite et al.
5,815,671 A    9/1998  Morrison
6,282,713 B1 * 8/2001  Kitsukawa et al. ............ 725/36
6,698,020 B1 * 2/2004  Zigmond et al. .............. 725/34

FOREIGN PATENT DOCUMENTS

| AU | 9670393 | 5/1997 |
|----|---------|--------|
| CA | 2188733 | 5/1997 |
| EP | 0 424 648 A2 | 5/1991 |
| EP | 0 772 360 A2 | 5/1997 |
| JP | 8-340525 | 12/1996 |
| JP | 9-65321 | 3/1997 |
| JP | 9-130346 | 5/1997 |
| JP | 11-55636 | 2/1999 |
| KR | 97-24983 | 5/1997 |

* cited by examiner

*Primary Examiner*—Hunter B. Lonsberry
(74) *Attorney, Agent, or Firm*—Frommer Lawrence & Haug LLP; William S. Frommer; Thomas F. Presson

(57) ABSTRACT

A broadcasting system, receiving device, and method that allows the viewer to set conditions for the display of commercials (CMs) with broadcast programs. A broadcasting device transmits the programs and CMs via separate channels. A receiving device receives the separate channels and records the CM information. The receiving device combines the recorded CM information with the programs for display in accordance with customer requirements set by the viewer. The customer requirements are also sent back to the commercial broadcasting company to adjust the CMs transmitted to the viewer and the fees charged for viewing the programs.

12 Claims, 10 Drawing Sheets

CM DATA 32

| ADCM 1 | CL 1 | COSMETIC CM | ADCM 2 | CL 2 | AUTOMOBILE CM | ADCM 3 | CL 3 | HOUSEWARES CM |

{a} {b} {c}

| ADCM 4 | CL 1 | COSMETIC CM | ADCM 5 | CL 2 | AUTOMOBILE CM | ADCM 6 | CL 3 | HOUSEWARES CM |

{d} {e} {f}

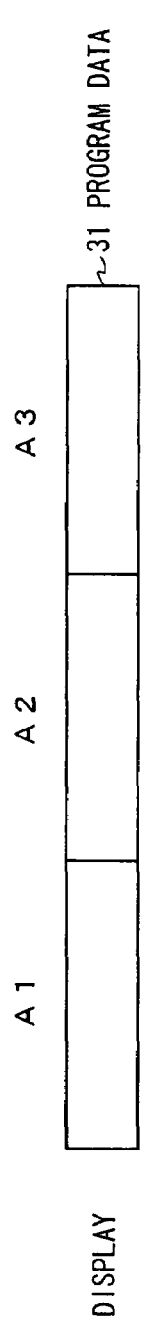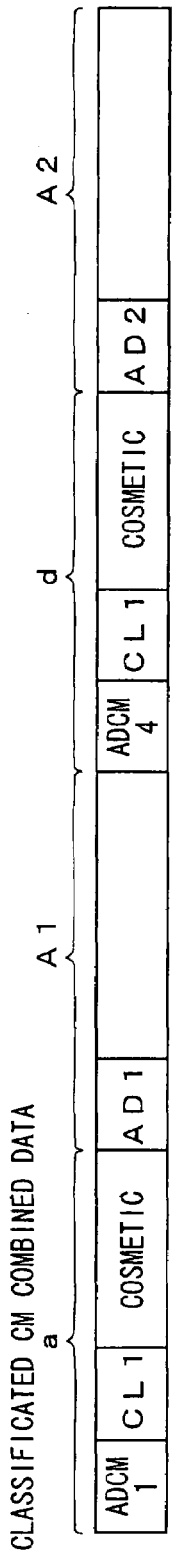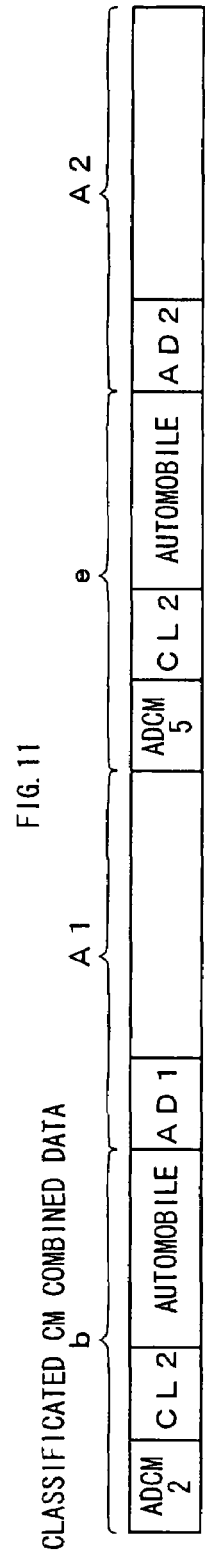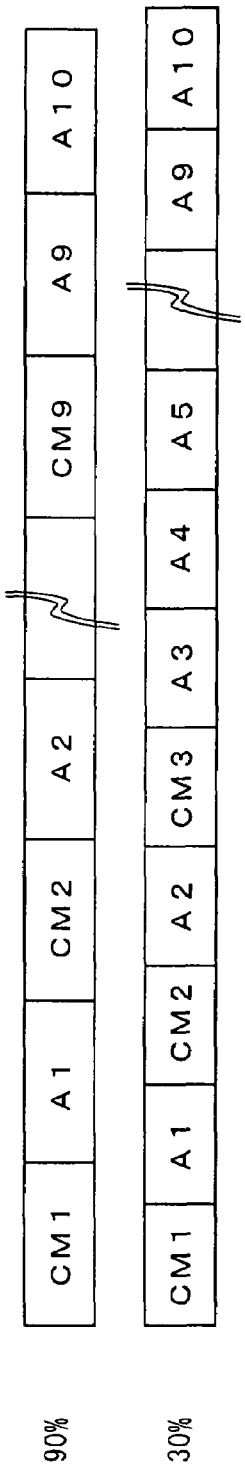
FIG. 10
FIG. 11
FIG. 12
FIG. 13

INFORMATION RECEIVER AND INFORMATION RECEIVING METHOD

TECHNICAL FIELD

The present invention relates to an information receiving device for receiving information and an information receiving method and especially relates to the information receiving device and the information receiving method that make the viewer capable of setting the condition of information contents.

BACKGROUND ART

At present the television station places programs and CMs (commercials) the fixed places of the television program to be telecast and the viewer just receives and watches the broadcast program in which programs and CMs are placed at the time of broadcasting. As the broadcasting pattern in which CMs are placed on the program, there exists the pattern of placing programs and CMs alternately in time division and the pattern to broadcast CMs and programs simultaneously by placing CMs over the programs as Telop (television opaque), and the programs and CMs are placed on the same channel and are telecast.

However, according to these broadcasting patterns, it has created a problem that the viewer's desire to view the CM broadcasting, such as the CM deletion request in exchange for the additional fee payment, the CM acceptance request on condition that the fee for paid broadcasting would be reduced, and the category selection request of CMs being telecast, would not be reflected at all.

Furthermore, in such broadcasting patterns, since the across-the-board CM broadcasting has been conducted without considering age, sex, occupation and hobby of the viewer, the efficiency of CM has not been satisfactory.

DISCLOSURE OF THE INVENTION

The present invention has been done considering the above points and the object of the present invention is to provide an information receiving device and an information receiving method that make the viewer is capable of personally setting or not setting the display of CM and setting the category of CM to be displayed.

To obviate such problems according to the present invention, in the broadcasting system to which the viewers can set the condition of broadcast contents, we provide a broadcast receiving device comprising; the program receiving means for receiving program broadcasts, the CM receiving means for receiving the CM broadcasts, the broadcast contents recording means for recording broadcast contents, the condition setting means for conducting the display condition setting of CM broadcasts, the control means for controlling the broadcast contents to be displayed.

At this point, the broadcasting device broadcasts the program broadcast and the CM broadcast. The broadcast receiving device stores the program broadcast and CM broadcast received, and displays programs and CMs according to the CM display condition selected by the viewer.

Furthermore, the broadcast receiving device that allows the viewer to set the condition of broadcast contents, comprises: the program receiving means for receiving program broadcasts, the CM receiving means for receiving CM broadcasts, the broadcast contents recording means for recording the broadcast contents, the condition setting means for setting the display condition of the CM broadcast, and the control means for controlling the broadcast contents to be displayed At this point, the program receiving means receives the main program broadcasting and the CM receiving means receives the CM broadcasting, the broadcast contents recording means records contents of broadcasts, the condition setting means sets the display condition of CM broadcasting to be selected by the viewer, and the control means controls contents of broadcasting to be displayed.

Furthermore, in the broadcast receiving method that allows the viewer to set the condition of broadcast contents, the broadcast receiving method provides steps for receiving the program broadcast, receiving the CM broadcast, recording the contents of the broadcast received, display setting the CM broadcast to be displayed, and for controlling the contents of broadcasting to be displayed.

According to this method, the program broadcasts and CM broadcasts received are recorded and the CM broadcast will be displayed according to the condition set by the viewer.

BRIEF DESCRIPTION OF DRAWINGS

FIG. 7 is a schematic diagram showing the program broadcasting information.

FIG. 8 is a schematic diagram showing the CM data.

FIG. 10 is a schematic diagram showing the program data.

FIG. 11 is a schematic diagram showing the classification CM combined data.

FIG. 12 is a schematic diagram showing the classified CM combined data.

FIG. 13 is a brief linear diagram showing the CM combined data at the time when the number of CM displays is specified.

BEST MODE FOR CARRYING OUT THE INVENTION

The present invention will be described in detail with reference to the accompanying drawings.

Figure 1:
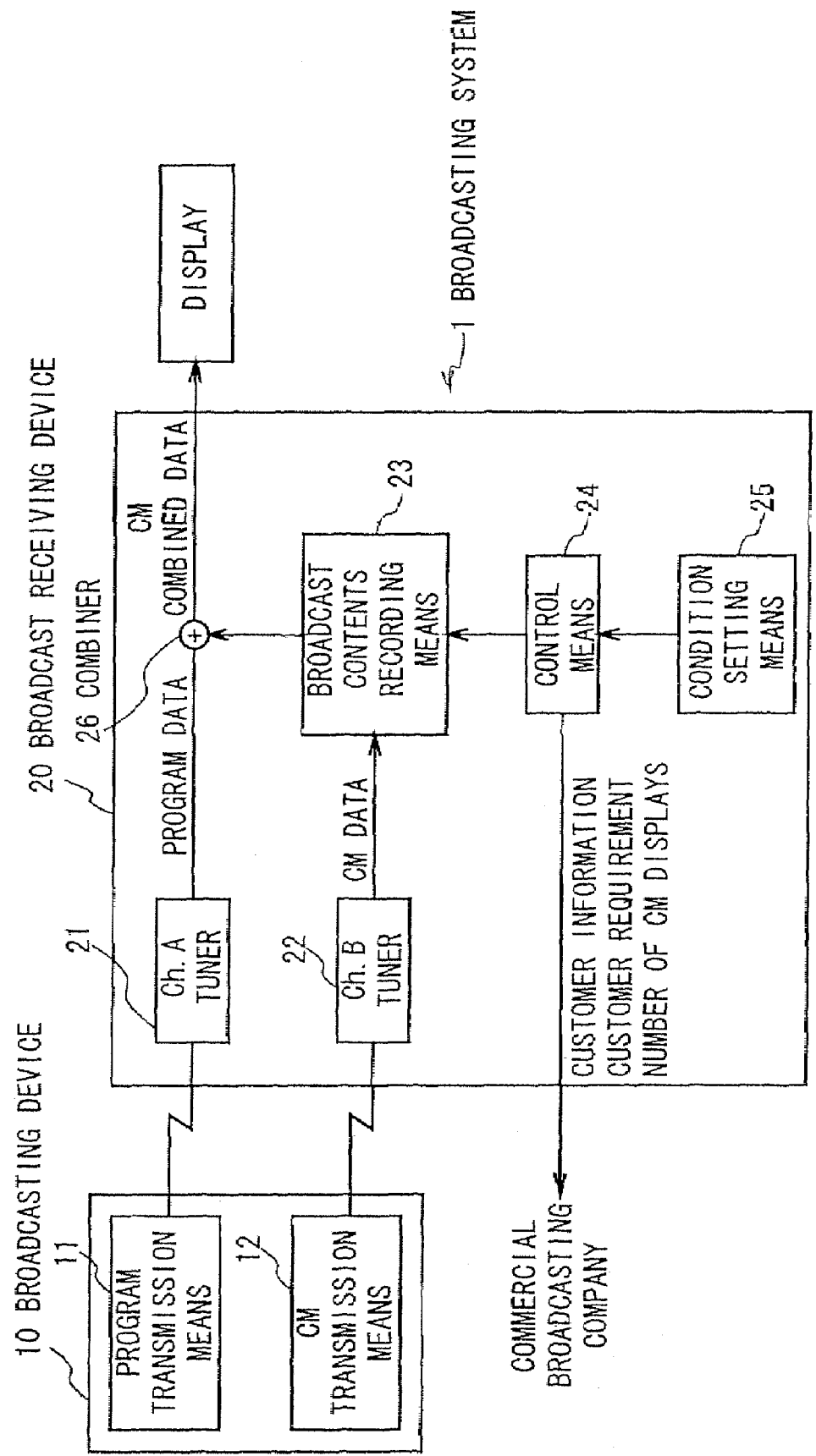
FIG. 1 is a systematic diagram according to the first embodiment.

Firstly, the first embodiment will be described hereunder. FIG. 1 is a brief linear diagram according to the first embodiment. The broadcasting system 1 of the present embodiment comprises a broadcasting device 10 for conducting the program and CM broadcasting and a broadcast receiving device 20 owned by the viewer for receiving the broadcast.

The broadcasting device 10 comprises the program transmission means 11 for transmitting program broadcasts and the CM broadcasting means 12 for transmitting CM broadcasts. The broadcast receiving device 20 comprises the program receiving means, Ch.A tuner 21, the CM receiving means, Ch.B tuner 22, the broadcast contents recording means 23 for recording the CM broadcast received at the Ch.B tuner 22 as CM data, the control means 24 for controlling the broadcast contents to be displayed and transmitting the display result to the commercial broadcasting company, the condition setting means 25 for entering the display condition of CM broadcasts, and a combiner 26 for combining the program data received by the Ch.A tuner 21 and the CM data extracted from the broadcast contents recording means 23.

The broadcast contents recording means 23 is electrically connected to the Ch.B tuner 22, the combiner 26 and the control means 24. And the control means 24 is connected electrically to the condition setting means 25. And the Ch.A tuner 21 is electrically connected with the combiner 26.

Then, the function of the broadcasting system 1 according to the present embodiment will be described in the following paragraphs.

Firstly, the viewer who uses the broadcasting system 1 conducts the display condition setting of CM by using the condition setting means 25 of the broadcast receiving device 20 which the viewer owns himself. The display condition may be set to include whether CM will be displayed or not, the classification of CM to be displayed, the viewer's sex, age, occupation and hobby.

The display condition entered by the condition setting means 25 is transmitted to the control means 24 and recorded on the recording device such as RAM (random access memory) in the control means 24. On the other hand, the broadcasting device 10 transmits the program broadcast concerning the program contents by the program transmission means 11 and transmits the CM broadcast related to the CM contents by the CM transmission means 12. At this point, the program broadcast and CM broadcast are transmitted via different channels respectively, and in this case, the program broadcast is transmitted via the Ch.A tuner and the CM broadcast is transmitted via the Ch.B tuner.

The program broadcasts and the CM broadcasts transmitted will be received by the broadcast receiving device 20 owned by the viewer. In this case, the program broadcasts are received by the Ch.A tuner 21, and the CM broadcasts art received by the Ch.B tuner. Then, the program broadcasts and CM broadcasts received are captured into the broadcast receiving device 20 as the program data and CM data respectively. The program data captured is reached to the combiner 26, while the CM data is recorded on the broadcast contents recording means 23.

The CM data recorded on the broadcast contents recording means 23 is invoked according to the setting condition recorded on the recording device in the control means 24, and the CM data invoked will reach to the combiner 26. Then the CM data reached to the combiner 26 is combined with the program data and transmitted to the display.

Figure 2:
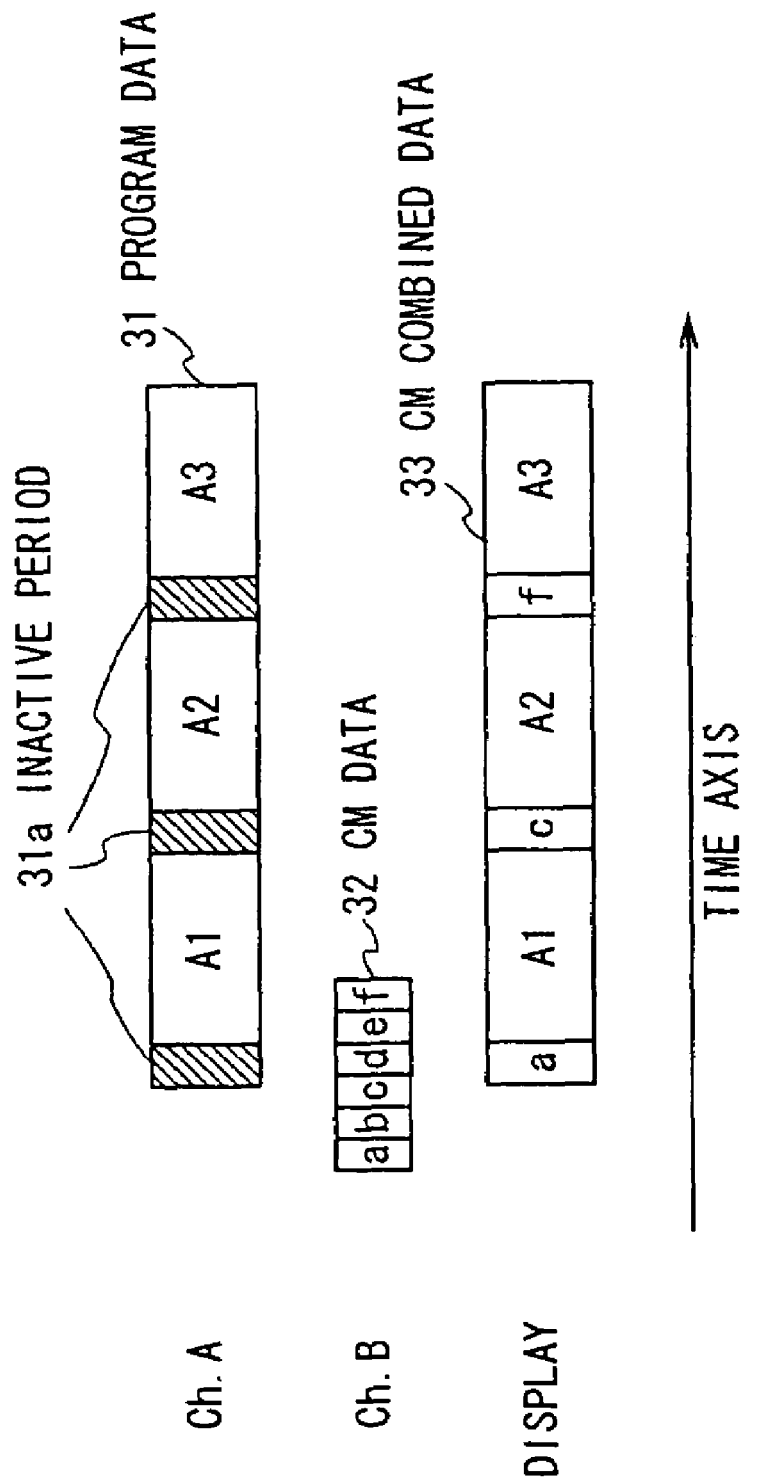
FIG. 2 is a schematic diagram showing the state in which the program data of Ch.A and the CM data of Ch.B are combined.

FIG. 2 is a diagram showing the state in which the program data 31 of Ch.A and the CM data 32 of Ch.B are being combined. In this figure the horizontal axis shows the time axis.

The program transmission means 11 of the broadcasting device 10 broadcasts program contents for the fixed period of time continuously by the Ch.A. And then, it stops the broadcasting of program contents for the fixed period of time and then starts the broadcasting of program contents continuously for the fixed period of time. Thus, the program transmission means 11 repeats these processings. Accordingly, the program data 31 to be received by the Ch.A consists of programs of A1, A2 and A3, that will be broadcasted continuously for the fixed period of time and the inactive period 31a during which no program to connect each program is broadcasted.

Furthermore, the CM transmission means 12 of the broadcasting system 10 broadcasts CM contents for the fixed period of time continuously by the Ch.B. Thus, the CM data 32 to be received by the Ch.A consists of only CMs, such as a, b, c.

The CM data 32 recorded on the broadcast contents recording means 23 will be selected according to the setting condition recorded on the recording device in the control means 24. In the case of FIG. 2, CMs of a, c and f are selected from the CM data 32 in accordance with the setting condition. Thus selected CM is invoked so that the inactive period 31a of the program data and its timing agree and transmitted to the combiner 26.

The combiner 26, by combining the program data 31 transmitted from the Ch.A and the CM invoked from the broadcast contents recording means 23 as described above, forms CM combined data 33. The CM combined data 33 is comprised of programs of A1, A2 and A3 placed at the same timing as the programs forming the program data 31 and the CMs of a, c and f placed at the same timing as the inactive period 31a of the program data 31.

Thus formed CM combined data 33 is transmitted to the display and the display is conducted using this CM combined data 33.

Thus, when the display is actually conducted, the control means 24 transmits the customer requirements such as customer information and the display condition and the information on the number of CM displays to the commercial broadcasting company. The commercial broadcasting company, upon receiving the customer requirements (such as customer information, display condition and the information on the number of CM displays), sets the program viewing fee for each viewer based on the requirements.

According to the present embodiment as described above, since the program broadcast and the CM broadcast are transmitted by the broadcasting device 10 via different channels, and the broadcast receiving device 20 receives the program broadcast and the CM broadcast transmitted via different channels as the program data 31 and the CM data 32, and records the CM data 32 once on the broadcast contents recording means 23, and the control means 24 invokes CM from the CM data 32 recorded according to the condition set by the condition setting means 25 in advance and placing this on the inactive period 31a of the program data 31, forms the CM combined data 33 and displays this CM combined data 33 on the display, the viewer becomes possible to view only CMs that reflect the viewer's personal desire.

Furthermore, according to the present embodiment, since only the CMs to which the viewer personally sets the condition can be displayed on the viewer's display, the CM advertising efficiency can be remarkably improved.

In this connection, according to the present embodiment, CMs are placed on the inactive period 31a of the program data. However, the CMs may be placed over the programs of the program data 31 as Telop.

Next, the second embodiment will be described in the following paragraphs.

Figure 3:
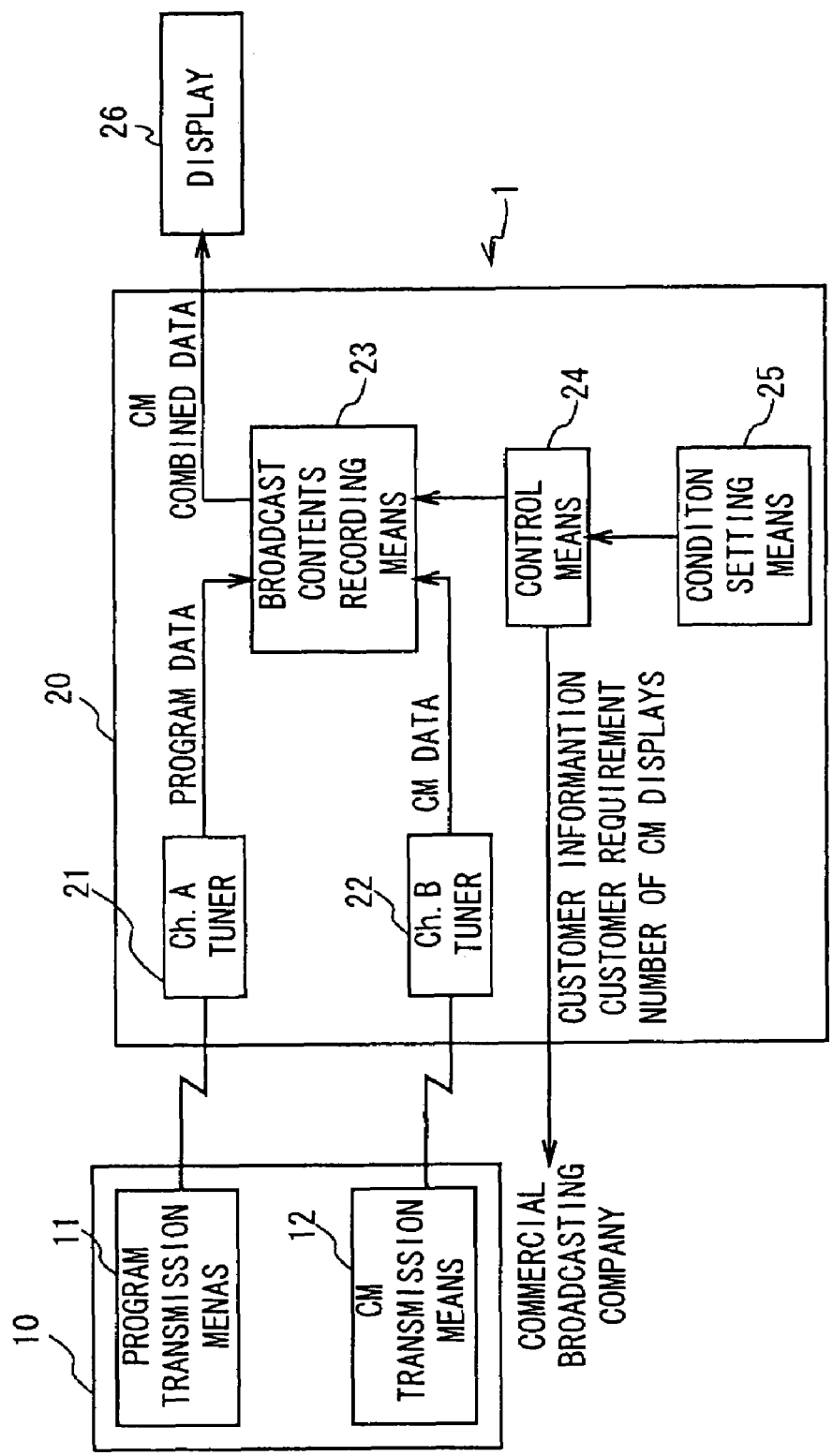
FIG. 3 is a systematic diagram according to the second embodiment.

FIG. 3 is a systematic diagram showing the second embodiment.

The broadcasting system 1 of this embodiment comprises a broadcasting device 10 for broadcasting programs and CMs and a broadcast receiving device 20 owned by the viewer for receiving the broadcast.

The broadcasting device 10 comprises the program transmission means 11 for transmitting program broadcast and the CM broadcast means 12 for transmitting CM broadcasts. The broadcast receiving means 20 comprises a Ch.A tuner 21 which is the program receiving means and for receiving program broadcasts, a Ch.B tuner 22, which is the CM receiving means for receiving the CM broadcast, the broadcast contents recording means 23 for recording the program broadcast received by the Ch.A tuner 21 as the program data and the CM broadcast received by the Ch.B tuner 22 as the CM data the transmission control means 24 for controlling the broadcast contents to the displayed and for transmitting the display results to the commercial broadcasting company, and the condition setting means 25 for entering the display condition of the CM broadcasts.

The broadcast contents recording means 23 is electrically connected to the Ch.A tuner 21, Ch.B tuner 22 and the control means 24, and the control means 24 is connected electrically to the condition setting means 25.

Next, the function of the broadcasting system 1 according to the present embodiment will be described as follows.

Firstly, the viewer who uses the broadcasting system 1 conducts the CM display condition setting by means of condition setting means 25 of the broadcast receiving device 20 owned by each viewer. The display condition entered by the condition setting means 25 is transmitted to the control means 24 and recorded on the recording device in the control means 24.

An the other hand, the broadcasting device 10 transmits the program broadcast by the program transmission means 11 and transmits the CM broadcast by the CM transmission means 12. At this point, the program broadcast and the CM broadcast are transmitted via separate channels respectively. In the case of FIG. 3, the program broadcast is transmitted via the Ch.A and the CM broadcast is transmitted via the Ch.B.

The program broadcast and the CM broadcast transmitted are received by the broadcast receiving device 20 per channel. In this case, the program broadcast is received by the Ch.A tuner 21, and the CM broadcast is received by the Ch.B tuner. Then, the program broadcast and the CM broadcast received are recorded on the broadcast contents recording means 23 as the program data and the CM data respectively.

The program data and the CM data recorded on the broadcast contents recording means 23 are combined in accordance with the setting condition recorded on the recording device in the control means 24 and transmitted to the display.

Figure 4:
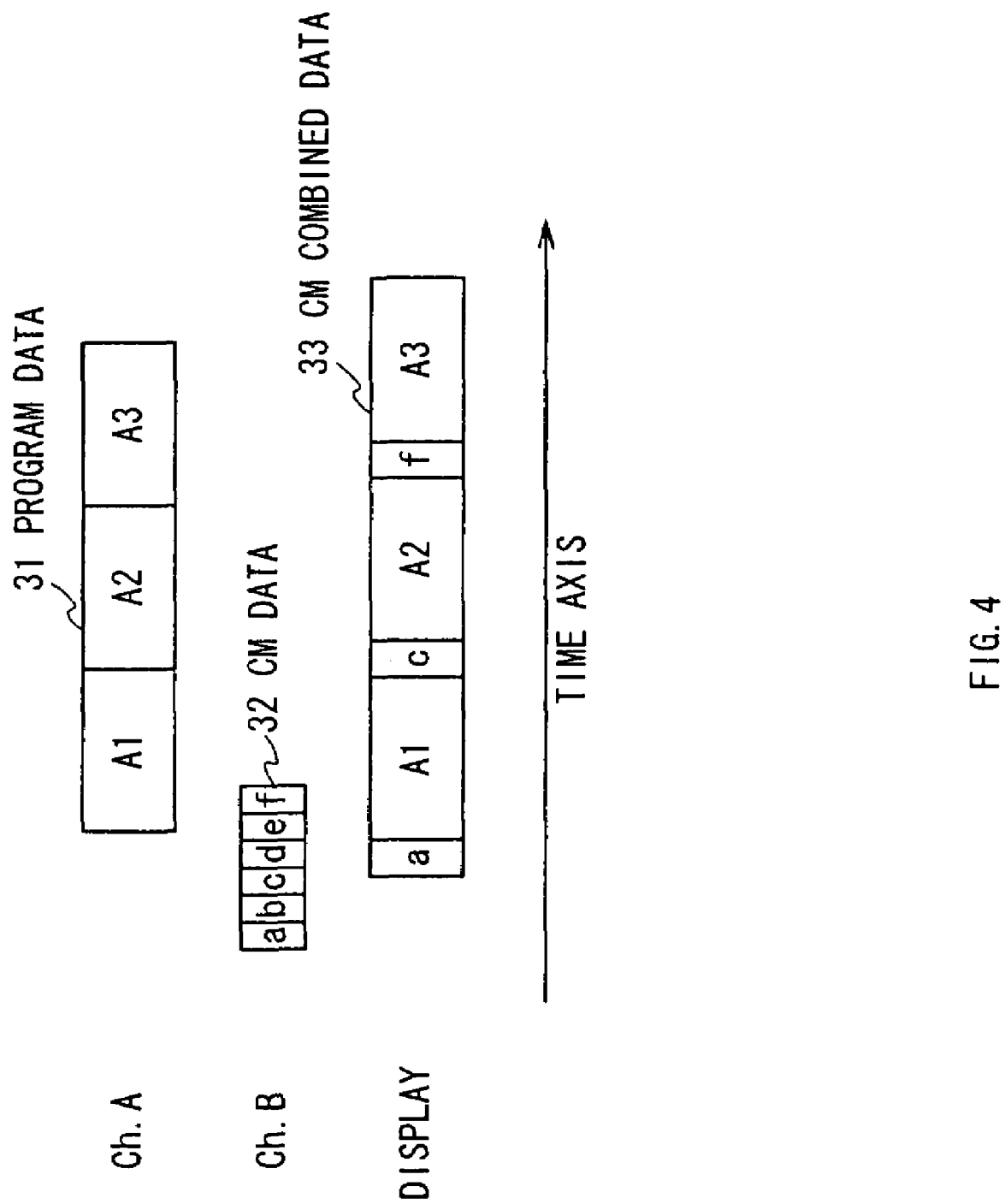
FIG. 4 is a schematic diagram showing the state in which the program data of Ch.A and the CM data of Ch.B are combined.

FIG. 4 is a diagram showing the state in which the Ch.A program data 31 and the Ch.B CM data 32 are being combined. The horizontal axis of this figure shows the time axis.

The program transmission means 11 of the broadcasting device 10 broadcasts the program contents for the fixed period of time continuously by the Ch.A. Accordingly, the program data 31 to be received by the Ch.A is comprised of only A1, A2, A3 programs.

Moreover, the CM transmission means 12 of the broadcasting device 10 broadcasts the CM contents for the fixed period of time continuously by the Ch.B. Accordingly, the CM data 32 to be received consists of only CM programs such as a, b, c.

The control means 24 reads out the CM selected from the CM data 32 from the broadcast contents recording means 23 according to the condition set by all program data 31 and the condition setting means 25 and forms the CM combined data 33 by placing CMs before and after programs. In the case of FIG. 4, CMs of a, c, f are selected, and the CM of a is placed before the program A1, the CM of c is placed between the programs A1 and A2, and the CM of f is placed between the program A2 and the program A3. In this case, since CMs are inserted between the program data being transmitted continuously, the CM combined data 33 will delay by CMs inserted.

In this connection, if the viewer refuses the CM display, CM would not be inserted and the CM combined data 33 would not delay with respect to the program data 31.

Thus formed CM combined data 33 is transmitted to the display and the display is conducted by this CM combined data 33.

Thus, when the display is actually conducted, the control unit 24 transmits the customer requirement such as customer information, display condition and the information such as the number of CM displays to the commercial broadcasting company. The commercial broadcasting company, upon receiving the customer requirement such as display condition and the information such as the number of CM displays, sets the program viewer's fee of each viewer based on said information.

According to the embodiment of the present invention as described above, the broadcasting device 10 transmits the program broadcast and the CM broadcast via different channels, the broadcast receiving device 20 receives the program broadcast and the CM broadcast transmitted via separate channels as the program data 31 and the CM data 32 and records these program data 31 and CM data 32 received on the broadcast contents recording means 23 once, and the control means 24 reads out the program data 31 and CM selected from the CM data 32 from the broadcast contents recording means 23 and placing these alternately, forms the CM combined data 33 and the CM combined data will be displayed. Thereby, the viewer becomes possible to view only CMs that reflect the viewer's personal desire.

Furthermore, according to the present embodiment, since only CMs to which the viewer personally sets the condition are to be displayed on the viewer's display, the efficiency of CM advertising can be remarkably increased.

Furthermore, the embodiment described above has dealt with the case of placing CMs between programs of the program data 31. However, CMs may be placed over the programs of the program data 31 as Telop.

Then, the third embodiment will be described in the following paragraphs.

Figure 5:
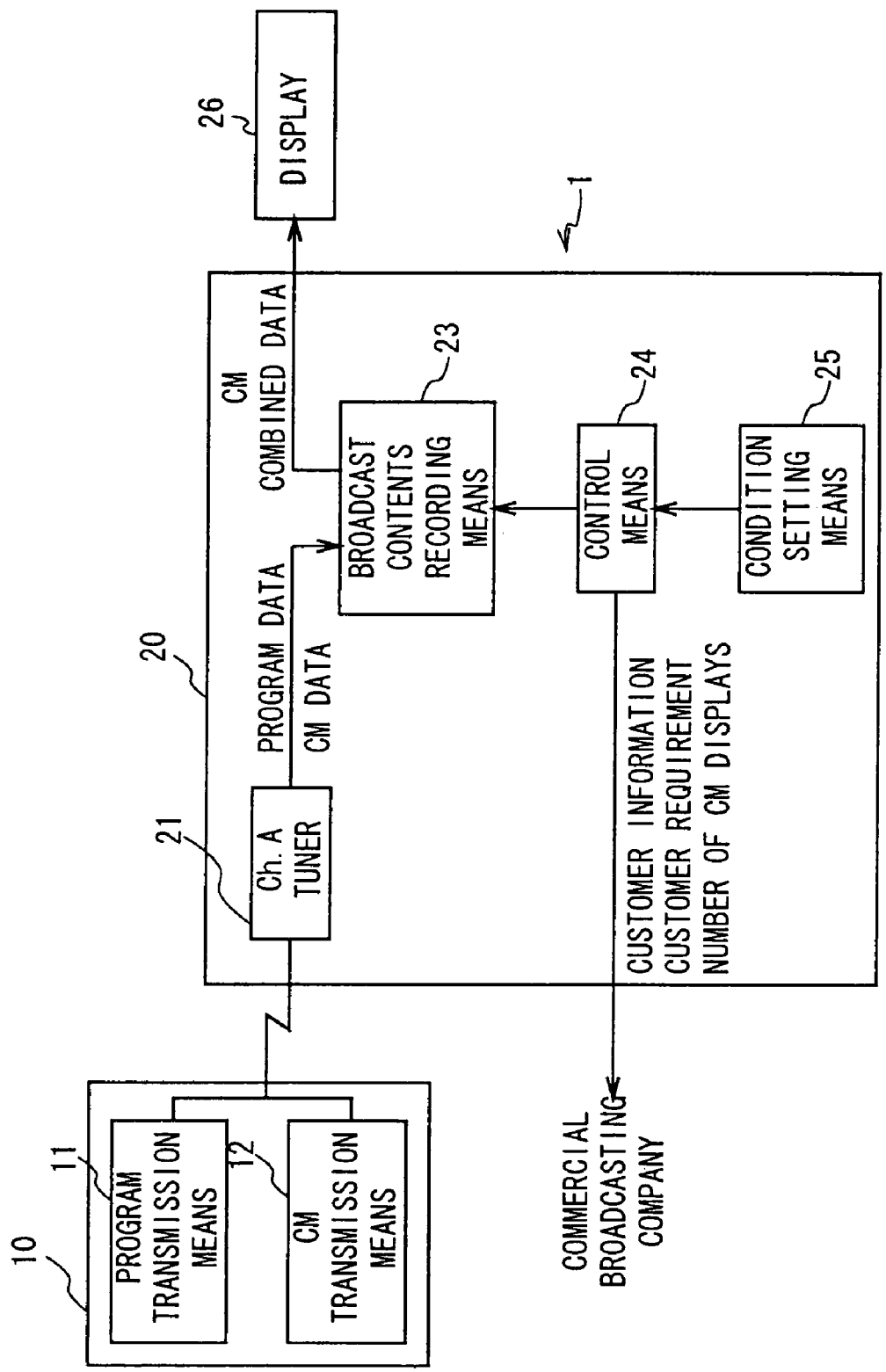
FIG. 5 is a systematic diagram according to the third embodiment.

FIG. 5 is a systematic diagram according to the third embodiment.

The broadcasting system 1 of this embodiment comprises the broadcasting device 10 for broadcasting the programs and CMs and the broadcast receiving device 20 owned by the viewer who receives the broadcasts.

The broadcasting device 10 comprises the program transmission means 11 for transmitting program broadcasts and the CM transmission means 1 for transmitting CM broadcasts. The broadcast receiving means 12 is comprised of the Ch.A tuner 21 which is the program receiving means and CM receiving means for receiving the program broadcasts and the CM broadcasts, the broadcast contents recording means 23 for recording the program broadcasts and CM broadcasts received at the Ch.A tuner 21 as the program data and the CM data the transmission control means 24 for controlling the broadcast contents to be displayed and for transmitting the display results to the commercial broadcasting company, and the condition setting means 25 for entering the display condition of CM broadcasts.

The broadcast contents recording means 23 is electrically connected to the Ch.A tuner 21 and the control means 24, and the control means 24 is connected electrically to the condition setting means 25.

Then, the function of the broadcasting system 1 according to the present embodiment will be explained.

Firstly, the viewer who uses the broadcasting system 1 conducts the display condition setting of CM of the broadcast receiving device 20 which he owns.

The broadcasting device 10 transmits the program broadcast by the program transmission means 11 and transmits the CM broadcast by the CM transmission means 12. At this point, the program broadcast and the CM broadcast are sent via the same channel shifting the transmission time alternately, such as the program broadcast is transmitted during the day time and the CM broadcast is transmitted during the mid-night.

The program broadcast and the CM broadcast transmitted are received by the Ch.A of the broadcast receiving device 20. Then the program broadcast and CM broadcast received are recorded on the broadcast contents recording means 23 as the program data and the CM data respectively.

The program data and the CM data recorded on the broadcast contents recording means 23 are combined according to the setting condition recorded on the recording device in the control means 24 and transmitted to the display.

Figure 6:
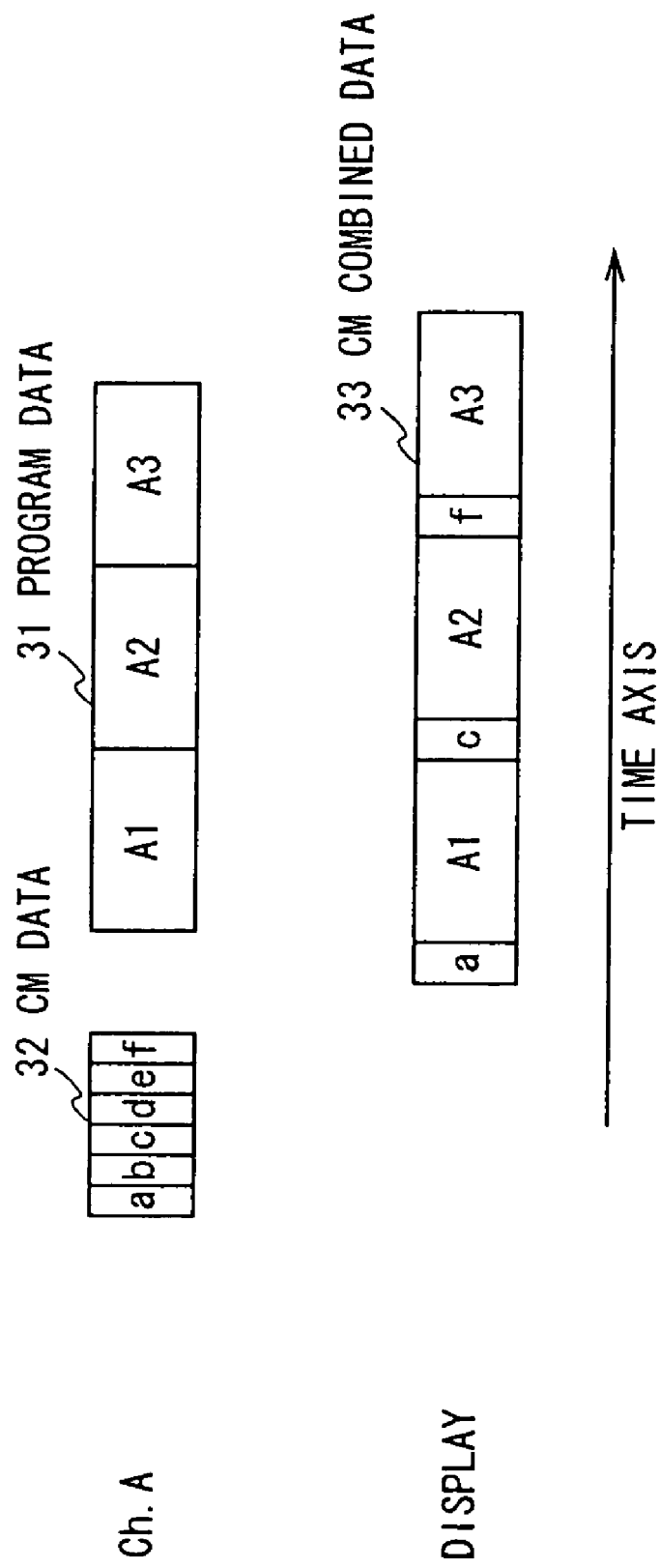
FIG. 6 is a schematic diagram showing the state in which the program data of Ch.A and the CM data are combined.

FIG. 6 is a diagram showing the state in which the Ch.A program data 31 and the CM data 32 are combined. A horizontal axis of this figure shows the time axis.

The CM transmission means 12 and the program transmission means 11 of the broadcasting device 10 transmit the CM broadcast and the program broadcast via the same channel shifting the time period.

The CM transmission means 12 of the broadcasting device 10 broadcasts CM contents continuously for the fixed time period. Accordingly, the CM data 32 to be received by the Ch.A consists of only CMs such as a, b and c.

Furthermore, the program transmission means 11 of the broadcasting device 10 broadcasts program contents continuously for the fixed time period. Therefore, the program data 31 to be received by the Ch.A consists of only programs of A1, A2 and A3.

The control means 24 reads out CMs selected from the CM data 32 according to the condition set by all program data 31 and condition setting means 25 from the broadcast contents recording means 23, and placing CMs before and after the programs, forms the CM combined data 33.

Thus formed CM combined data 33 will be transmitted to the display, and the display will be conducted by using this CM combined data 33.

Thus, when the display is actually conducted, the control means 24 transmits the customer requirement such as customer information, display condition and the information such as the number of CM displays to the commercial broadcasting company. The commercial broadcasting company, upon receiving the customer requirement such as customer information, display condition and the number of CM displays, sets the program viewing fee of each viewer based on said information.

According to the present invention as described above, the broadcasting device 10 transmits the program broadcasts and the CM broadcasts via the same channel shifting the time slot. The broadcast receiving device 20 receives the program broadcast and the CM broadcast transmitted as the program data 31 and the CM data 32 respectively, and records these program data 31 and CM data 32 received on the broadcast contents recording means 23 once. The control means 24 reads out the program data 31 and the CM selected from the CM data 32 according to the condition set from the broadcast contents recording means 23 and forms the CM combined data 33 placing these alternately and the CM combined data 33 will be displayed on the display. Accordingly, the viewer becomes possible to view only CMs that reflect the viewer's personal desire.

Furthermore, according to the present embodiment, since the CM to which the viewer personally set the condition can be displayed on the display focussing only on this CM, the efficiency of CM advertising can be remarkably increased.

In this connection, according to this embodiment, CMs are placed between programs of the program data 31. However, CMs may be placed over programs of the program data 31 as Telop.

In the program data 31 comprising the program broadcasts, if blocks shown as A1, A2 and A3 are to be defined as the program block respectively, the address data to specify these program blocks are inserted to the predetermined positions of the program, i.e., head of each program block, as AD1, AD2 and AD3 respectively as shown in FIG. 7.

Furthermore, similarly in the CM data 32, if blocks shown by a, b, c, d, e, f, . . . are defined as the CM block respectively, the ADCM address data to specify the CM blocks, ADCM1, ADCM2, . . . ADCM5, ADCM6, are inserted to the predetermined position of the block such as the head of each block as shown in FIG. 8.

Furthermore, as shown in FIG. 8, in each CM block a, b, c, d, e, f, data showing the classification of these CM blocks are inserted as CL1, CL2, CL3 following the CM address data. Accordingly, here CM blocks a and d, CM blocks b and e, and CM blocks e and f are regarded as CM data that belong to the same category.

More specifically, as shown in FIG. 8, CM blocks a and d can be considered as the CM data associated with cosmetics, CM blocks b and e can be considered as the CM data related to automobiles, and CM blocks c and f can be regarded as the CM data associated with housewares.

As a matter of course, CM blocks a and d may be the CM of the same cosmetics or these may be the CM of different cosmetics of the same company or these may be the cosmetics of different companies. And the same applies to CM blocks b. That is, these CMs may be of the same type of automobiles, or the CMs may be different types of automobiles, or the CMs of the different companies may do.

According to the third embodiment described in FIG. 5 will be explained in detail referring to FIGS. 8 and 9 as follows. A more detailed example of the condition setting means 25 in FIG. 5 will be shown in FIG. 9.

Figure 9:
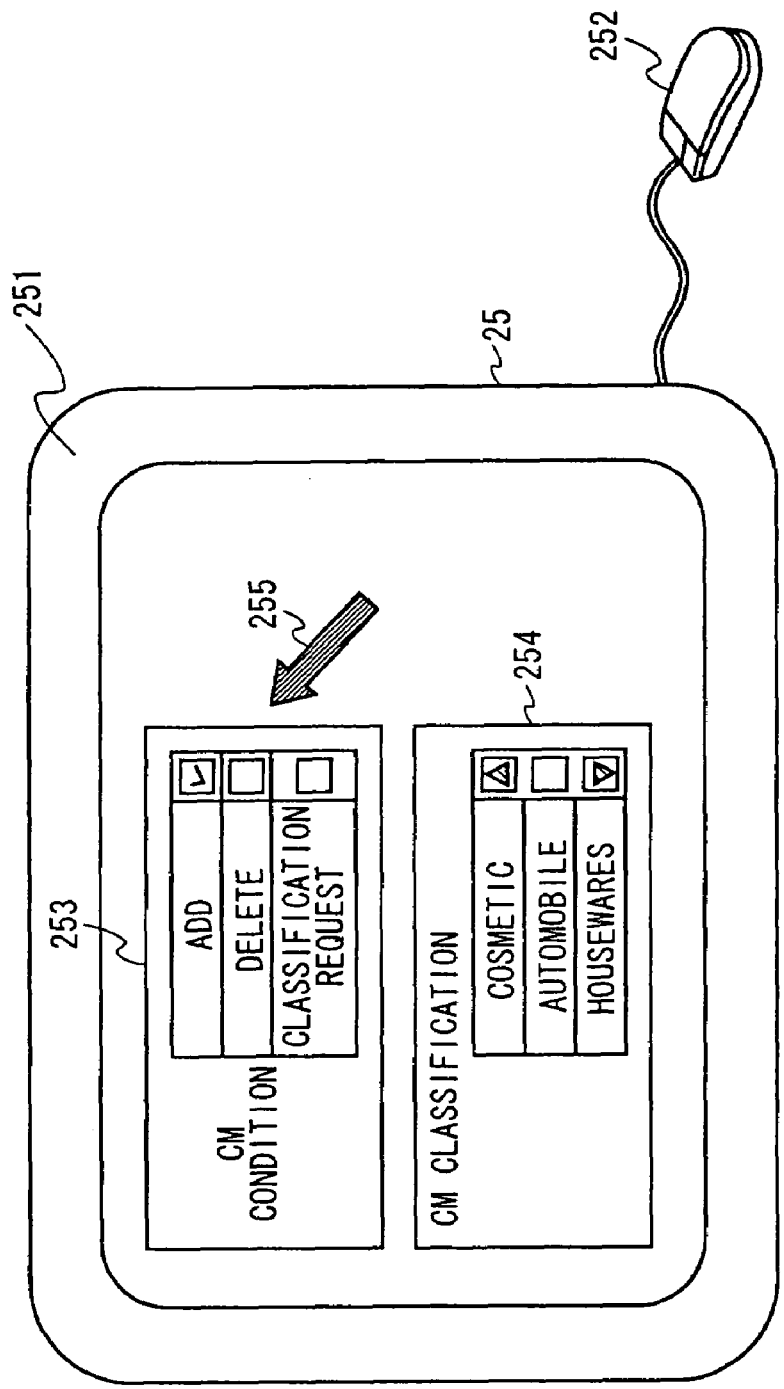
FIG. 9 is a brief linear statistic diagram showing the condition setting means 25 of FIG. 5 in detail.

FIG. 9 generally shows the condition setting means 25, and this condition setting means 25 comprises an information terminal device 251 and a mouse 252 as the input means for inputting its condition. Of course, it is not necessary that the display screen would be included in the information terminal device 251 but the display that is not displayed on FIG. 5 may be used.

As shown in FIG. 9, a CM condition window 253 and a CM classification specifying window 254 are displayed on the display screen of the information terminal device 251. And the viewer desired CM condition and CM classification will be specified by a cursor 255 on the display screen using the mouse 252.

For example, when the viewer requests additional CMs hoping that the fee for the CM broadcast would be reduced, he may click the mouse by selecting the item "add" of the CM condition window 253 by moving the cursor 255.

If the viewer wants to enjoy the program from which the CM is deleted even though he has to pay an excess fee more or less, he may click the mouse selecting the item "delete" of the CM condition window 253.

Furthermore, if the viewer requests the specific CM only, he may click the mouse by selecting the item "classification request" of the CM condition window 253 as well.

Furthermore, if the viewer conducts the CM classification request using the CM condition window 253, he can select the desired CM classification from the classification displayed on the CM classification window 254 of the display device. In this case, the viewer, moving the cursor 255 in the CM classification window by using the mouse 252, selects the desired CM classification and clicks.

With this arrangement, the condition setting data set by the viewer as described above will be transmitted to the control means 24 from the information terminal 251 (the condition setting means 25). The control means 24, transmitting the condition setting data obtained from the condition setting means to the commercial broadcasting company, transmits the control data to the broadcast contents recording means 23.

At the broadcast contents recording means 23, the program data and the CM data recorded will be combined in the predetermined order by the control data from the control means 24 and transmitted to the display as the CM combined data.

In the case where the viewer selects "add" on the CM condition window 253, all CMs (a, b, c, d, e, f) transmitted from the transmission means and recorded on the broadcast contents recording means 23 are inserted between program blocks in order regardless of the contents and classification of CM as shown in FIG. 6 and these are displayed on the display screen as the CM combined data 33.

Moreover, if the viewer selects "delete" on the condition window 253, as shown in FIG. 10 only the program data 31 is transmitted to the display from the broadcast contents recording means 23 and will be displayed.

Furthermore, if the viewer selects "cosmetic" on the CM classification window 254 after selecting "classification request" on the condition window 253, for example, the broadcast contents recording means 23 extracts only the CM data related to cosmetics from the CM data shown in FIG. 8 based on the control data from the control means 24, and inserting these between program blocks A1, A2, . . . of the program data 31 respectively as shown in FIG. 11, forms the classification CM combined data. And this classification CM combined data formed will be displayed on the display screen.

Moreover, as shown in FIG. 12, if the viewer selects "automobile" on the CM classification window 254, the broadcast contents recording means 23 forms classification CM combined data in which only the CM data related to automobile are inserted between each program block A1, A2, in the same manner as in the case described above. This classification CM combined data formed will be displayed on the display screen.

In this connection, only 3 types of CM conditions are displayed on the CM condition window 253 in FIG. 9. This is because to simplify the explanation and it is easily understandable that in practice, various other conditions can be set. And as described above, the number of CMs to be displayed is one of conditions.

In the case of specifying the number of CM displays, the specification, such as 90%, 80% . . . 30%, 20%, 10% can be conducted. For example, if the specification of "90%" is conducted, nine (9) CM data will be combined to ten (10) program data blocks. And the CM combined data in which according to the "80%" specification, 8 CM data are combined to 10 program data blocks, 7 CM data are combined to 10 program data blocks according to the 70% specification, 3 CM data are combined to 10 program data blocks according to the "30%" specification and 2 CM data are combined according to the "20%" specification, can be formed.

FIG. 13 shows examples of the 90% specification and 30% specification. In the case of 90% specification, CM1 is followed by the program block A1, CM2, A2, CM3, A3, . . . CM9, A9, and up to this point CM blocks and program blocks are placed alternately, and the program block 10 is placed right after the program block A9. That is 9 CM blocks are placed with respect to 10 program blocks.

Similarly, in the case of 30% specification, CM1 is followed by A1, CM2, A2, CM3, A3, and after A3 only program blocks A4, A5, A6, . . . A9, A10 are placed. More specifically, 3 CM blocks are placed with respect to 10 program blocks.

These data concerning the number of CM displays will be also transmitted to the commercial broadcasting company. The commercial broadcasting company sets the fee based on the data related to the number of CM displays.

As shown in FIG. 7, program blocks are added by addresses showing each block. More specifically, AD1, AD2, AD3 are added to program blocks A1, A2 and A3 respectively.

Furthermore, as shown in FIG. 8, CM blocks are also added by addresses showing each block. Moreover, CM blocks are added by data showing the CM classification following addresses. In FIG. 8, as the data showing CM classifications, "CL1" is made as the classification data showing cosmetic, "CL2" is the classification data showing automobile, and "CL3" is the classification data to show housewares.

Based on the control data from the control means 24, the broadcast contents recording means 23 combines the program blocks and the CM blocks according to addresses. For example, if the CM condition "add" is selected by the condition setting means 25, control data are supplied to the broadcast contents recording means 23 by the control means. Then, the broadcast contents recording means 23 combines the program block (A1) having the address AD1 of the program block shown in FIG. 8 and the CM block (a) having the address ADCM1 of the CM block shown in FIG. 8.

Similarly, the program block (A2) will be combined with the CM block (b) based on the address AD2 and ADCM2, and the program block (A3) will be sequentially combined with the CM block of ADCM3. With this arrangement, the broadcast contents recording means 23 forms CM combined data in which program blocks and CM blocks are combined as shown in FIG. 8 and supplies to the display device 26.

Moreover, at the time when the CM classification request is conducted by the condition setting means 26, if the viewer desires only the cosmetic CM, the broadcast contents recording means 23 selects only CM blocks having the classification data "CL1" showing the CM of cosmetics from among CM blocks recorded and combines these with the program blocks. For example, the broadcast contents recording means 23 combines the program block A1 to which the address AD1 is attached shown in FIG. 7 and the CM bloc a having the classification data "CL1" and the address ADCM1 shown in FIG. 8. Then, similarly, it combines the program block A2 and the CM block d having the classification data "CL1" and the address ADCM4. With this arrangement, the broadcast contents recording means 23 forms the classification CM combined data shown in FIG. 11 or FIG. 12 and supplies these to the display device 26.

Figure 14:
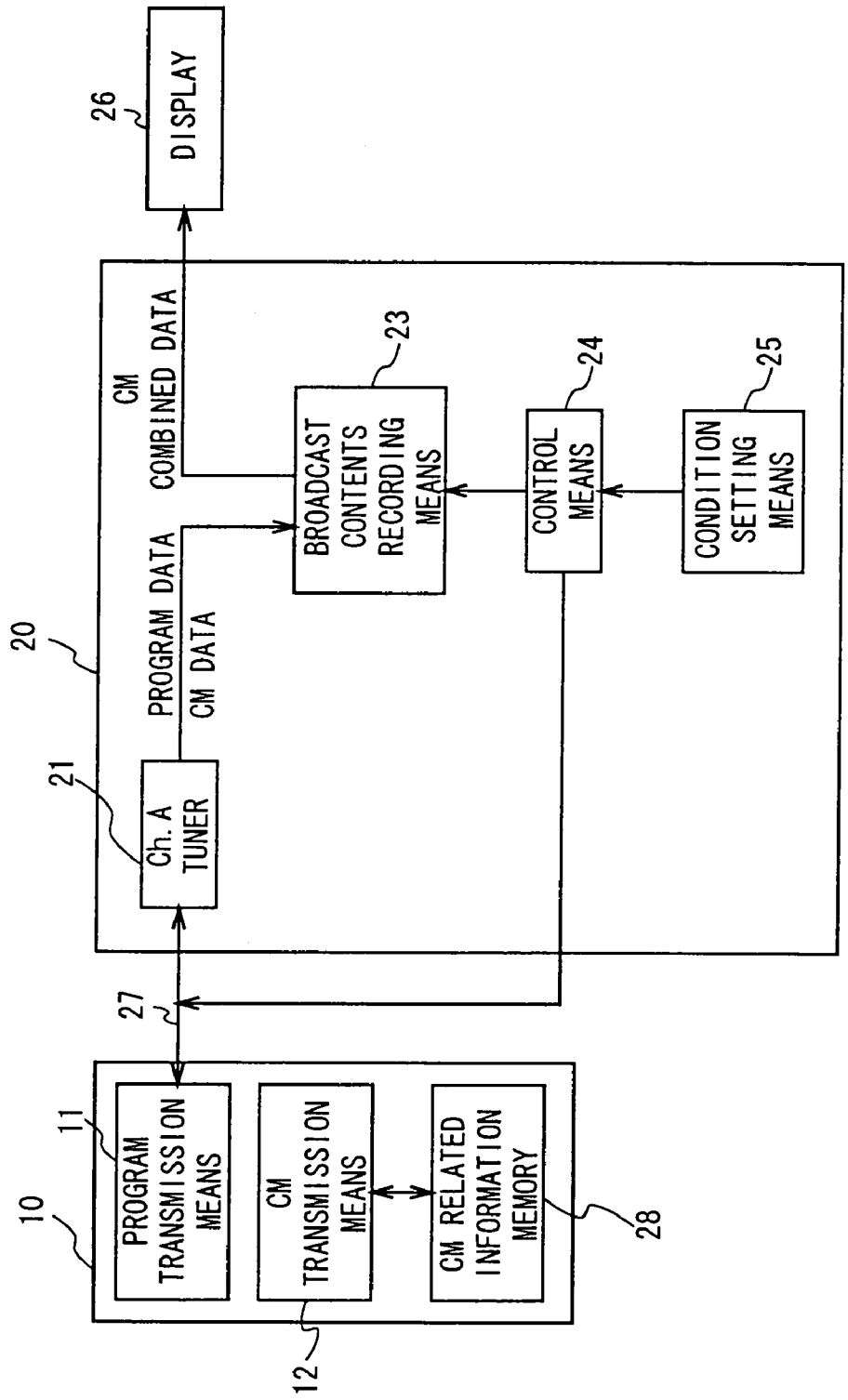
FIG. 14 is a systematic diagram showing the program providing means according to the other embodiment.

Furthermore, the following modification can be considered. The configuration of FIG. 14 in accordance with the present invention is constituted by the configuration shown in FIG. 5 to which the CM related information memory 28 is added. And changing the broadcasting device 10 to the program providing means 10, and the broadcast receiving device 20 to the program receiving means 20, the program providing means 10 and the program receiving means 20 are connected via a bidirectional bus or a net 27. According to the configuration as described above, the control data from the control means 24 will be transmitted to the program providing means 10 via said bidirectional bus or the net 27.

In the CM related information memory 28 various information relating to the CM data transmitted from the CM transmission means 12 are stored. Normally this CM related information would not be transmitted to the program receiving device side, however, only when the viewer requests, this CM related information will be sent to the program receiving means via the bus or the net 27 and recorded on the broadcast contents recording means 23.

If the viewer wants to get more detailed information while he is watching CM, and he conducts the CM related information request by means of the condition setting means 25, his request is supplied as a request information to the bus or net 27 via the control means. Upon receiving this request information, the program providing means 10 extracts the predetermined CM related information from the CM related information memory 28 and these are recorded on the broadcast contents recording means of the program receiving means 20 via the CM transmission means 12, the bus or net 27.

According to the foregoing construction, when the viewer conducts the CM classification request and watches his desired CM only, he can further confirm the CM related information. More specifically, for example, when the viewer saw the CM of automobile, he can find information described on the catalog prepared at the car dealer, such as the capacity of the car, the number of models or a variety of optional devices, the price, the method of payment, etc.

According to the present invention as described above, since the program broadcast and CM broadcast transmitted from the broadcasting device are received respectively, these broadcasts received are recorded on the broadcast contents recording means, and the control means forms the CM combined data to be displayed based on the condition set, the viewer becomes possible to watch only CMs that reflect the viewer's personal desire.

Furthermore, according to the present invention, since the CM to which the viewer personally sets condition is to be displayed on the viewer's display, the efficiency of CM advertising can be remarkably increased.

INDUSTRIAL APPLICABILITY

The present invention can be applied to the broadcasting system for broadcasting the broadcast information including commercial information.

The invention claimed is:

1. An information receiving device for receiving, at a variable subscription fee, separately transmitted program information and commercial information, and allowing a viewer to set display conditions for displaying the commercial information with the program information, comprising:
   receiving means for receiving the program information and the commercial information on a first channel; wherein the commercial information is received and then the program information is received;
   condition setting means for the viewer to set display conditions for the commercial information, including an option to display a selectable percentage of commercial information varying in a range from 0 to 100 percent and including percentages greater than 0 and less than 100;
   control means for forming control data on the basis of the display conditions;
   combining means for combining said program information with said commercial information in accordance with said control data and outputting the combined program and commercial information for display;
   transmission means for transmitting the control data to a source company which transmits the program information and the commercial information and which determines a subscription fee in accordance with the selectable percentage option set by the viewer;
   wherein said control means, at the viewers request, and in response to viewer operation of the condition setting means causes the transmission of commercial related information to be transmitted from a commercial related information memory; and
   wherein said display conditions include an option to not display any commercial information such that only program information is displayed.

2. The information receiving device according to claim 1, further comprising recording means for recording at least said commercial information.

3. The information receiving device according to claim 1, wherein a broadcasting source adjusts the transmitted commercial information on the basis of the display conditions.

4. The information receiving device according to claim 1, wherein the source company adjusts a fee charged to the viewer on the basis of the display conditions.

5. The information receiving device according to claim 1, wherein the display conditions indicate that the commercial information should not be combined with the program information.

6. The information receiving device according to claim 1, wherein the display conditions indicate classifications of the commercial information which should be combined with the program information.

7. An information receiving method of receiving, for a variable subscription fee, separately transmitted program information and commercial information, and allowing a viewer to set display conditions for displaying the commercial information with the program information, comprising the steps of:
   receiving the program information and the commercial information on a first channel; wherein the commercial information is received and then the program information is received;
   allowing the viewer to set display conditions for the commercial information, including an option to display a selectable percentage of commercial information varying in a range from 0 to 100 percent and including percentages greater than 0 and less than 100;
   forming control data on the basis of the display conditions;
   combining said program information with said commercial information in accordance with said control data and outputting the combined program and commercial information for display;
   transmitting the control data to a source company which transmits the program information and the commercial information and which determines a subscription fee in accordance with the selectable percentage option set by the viewer;
   requesting through operation of a condition setting means the display of commercial related information; and
   transmitting the commercial related information from a commercial related information memory;
   wherein said display conditions include an option to not display any commercial information such that only program information is displayed.

8. The information receiving method according to claim 7, further comprising the step of recording at least said commercial information.

9. The information receiving method according to claim 7, wherein the source company adjusts a fee charged to the viewer on the basis of the display conditions.

10. The information receiving method according to claim 7, wherein a broadcasting source adjusts the transmitted commercial information on the basis of the display conditions.

11. The information receiving method according to claim 7, wherein the display conditions indicate that the commercial information should not be combined with the program information.

12. The information receiving method according to claim 7, wherein the display conditions indicate classifications of the commercial information which should be combined with the program information.

* * * * *